(12) United States Patent
Kim

(10) Patent No.: US 8,470,471 B2
(45) Date of Patent: *Jun. 25, 2013

(54) ELECTROCHEMICAL CELL HAVING QUASI-BIPOLAR STRUCTURE

(75) Inventor: Seong Min Kim, Daejeon (KR)

(73) Assignee: Kim's Techknowledge Inc., Daejeon (KR)

( * ) Notice: Subject to any disclaimer, the term of this patent is extended or adjusted under 35 U.S.C. 154(b) by 433 days.

This patent is subject to a terminal disclaimer.

(21) Appl. No.: 12/681,592

(22) PCT Filed: Oct. 10, 2008

(86) PCT No.: PCT/KR2008/005985
§ 371 (c)(1),
(2), (4) Date: Apr. 2, 2010

(87) PCT Pub. No.: WO2009/048302
PCT Pub. Date: Apr. 16, 2009

(65) Prior Publication Data
US 2010/0227208 A1  Sep. 9, 2010

(30) Foreign Application Priority Data
Oct. 12, 2007 (KR) .................. 10-2007-0103033

(51) Int. Cl.
- H01M 6/42 (2006.01)
- H01M 6/46 (2006.01)
- H01M 2/24 (2006.01)
- H01M 2/02 (2006.01)
- H01M 6/08 (2006.01)
- H01M 2/08 (2006.01)
- H01G 9/00 (2006.01)

(52) U.S. Cl.
USPC .......... 429/159; 429/149; 429/152; 429/158; 429/160; 429/164; 429/178; 429/180; 361/502

(58) Field of Classification Search
USPC ......... 429/152–154, 158–161, 164, 131–133, 429/149, 178, 180; 361/502
See application file for complete search history.

(56) References Cited

U.S. PATENT DOCUMENTS

| | | | |
|---|---|---|---|
| 4,283,843 A | * | 8/1981 | Hooke .................. 29/623.1 |
| 4,777,101 A | * | 10/1988 | Blomberg et al. .......... 429/129 |
| 2004/0161663 A1 | * | 8/2004 | Nishide .................. 429/152 |

FOREIGN PATENT DOCUMENTS

| | | |
|---|---|---|
| EP | 1612873 A1 | 4/2006 |
| JP | 57-27570 A | 2/1982 |
| JP | 09-231993 A | 9/1997 |
| JP | 2004-253168 A | 9/2004 |
| JP | 2004-253284 A | 9/2004 |
| JP | 2005-353722 A | 12/2005 |
| KR | 1020050113215 A | 12/2005 |
| WO | WO 79/00229 A1 | 5/1979 |

OTHER PUBLICATIONS

International Search Report for PCT/KR2008/005985 filed Oct. 10, 2008.

* cited by examiner

*Primary Examiner* — Patrick Ryan
*Assistant Examiner* — Julian Anthony

(57) ABSTRACT

Provided is an electrochemical cell having a quasi-bipolar structure, particularly, a case of the electrochemical cell in which an electrode assembly is accommodated. A reliable electrolyte isolation barrier wall is disposed between the case and the electrode assembly, and an electric connection part constructed using the case is provided for the electrochemical cell for voltage equalization.

14 Claims, 8 Drawing Sheets

I ; CURRENT
t ; CHARGE TIME

US 8,470,471 B2

ELECTROCHEMICAL CELL HAVING QUASI-BIPOLAR STRUCTURE

TECHNICAL FIELD

The present disclosure relates to a modularized electrochemical cell having a quasi-bipolar structure, and in particular to, an electrochemical cell including a case accommodating an electrode assembly, a reliable electrolyte isolation barrier wall between the case and the electrode assembly, and an electric connection part constructed using the case for voltage equalization.

BACKGROUND ART

In general, electrochemical cells have a mono polar structure. Such a mono polar electrochemical cell includes a positive electrode composed of a positive active material formed on a current collector and a negative electrode composed of a negative active material formed on another current collector. These electrodes are disposed with opposite polarity sides facing each other, and a separator is inserted between the electrodes to form a unit-cell structure.

FIG. 1 illustrates a mono polar electrochemical cell of the related art.

Referring to FIG. 1, the electrochemical cell 10 of the related art includes a positive electrode 11, a negative electrode 12, a separator 13, an electrolyte 14, terminals 15-1 and 15-2, and a case 16. The illustrated electrochemical cell is the minimum basic operation unit which is called a unit cell.

Electric energy is stored in the positive electrode 11 and the negative electrode 12.

The separator 13 inserted between the positive and negative electrodes 11 and 12 is electrically nonconductive. However, the separator 13 may be omitted if the positive and negative electrodes 11 and 12 can be not in contact with each other without the separator 13. In a recent lithium polymer battery, solid polymer electrolyte is used instead of a separator; however, the solid polymer electrolyte contains a liquid electrolyte, and electrochemical reactions are produced by ions contained in the liquid electrolyte. That is, basically, the lithium battery is not different from a battery using a separator and a liquid electrolyte.

The separator 13 is formed of a material capable of transmitting the electrolyte 14, such as porous polymer, fiber glass mat, and paper.

The operational voltage of such electrochemical unit cells having the above-described structure is only several volts. Among electrochemical cell batteries, a lithium ion battery has a relatively high operational voltage; however, the nominal voltage of the unit cells of the lithium ion battery is also low at about 3.6 Volts.

Therefore, electrochemical cells should be connected in series for being used in application fields such as industrial and vehicle application fields requiring several tens to several hundreds of volts, as shown by unit cells 21, 22, and 23 in FIG. 2.

Since the unit cells 21, 22, and 23 are connected in series, the assembled structure and assembling processes are complicated, and additional parts such as bus bars and screws are necessary. Furthermore, the volume, weight, and resistance of the assembled structure are increased. As shown in FIG. 2, bus bars are used to connect neighboring unit cells, and screws are used to fix the bus bars to the unit cells.

An electrochemical cell 30 having a bipolar structure as shown in FIG. 3 has been developed to address the above-described limitation.

In the electrochemical cell 30 having a bipolar structure, electrodes are configured such that both sides of current collectors 31 have opposite polarities and electrodes having opposite polarities face each other with a separator 32 being disposed therebetween. The lowermost electrode is composed of an active material layer formed on one side of the lowermost current collector 31, and the uppermost electrode is composed of an active material layer formed on one side of the uppermost current collector 31.

In manufacturing electrodes of the bipolar electrochemical cell 30, if positive and negative electrodes are formed on the same material of the current collector 31, a positive active material layer 33 and a negative active material layer 34 are formed on both sides of the current collector 31 having a sheet shape. If positive and negative electrodes have to be formed on different materials of the current collector 31, a complex current collector having a laminated structure formed of different materials is used as the current collector 31. In FIG. 3, reference numeral 35 denotes gaskets, and reference numerals 36 and 37 denote terminals. The gaskets 35 are used as electrolyte sealing and isolating members for sealing unit cells, such that undesired phenomena such as current leakage, side reactions, corrosion caused by the side reactions can be prevented between unit cells.

Generally, a current collector of a positive electrode of a lithium ion battery is formed of aluminum, and a current collector of a negative electrode is formed of copper. In a lithium ion battery having a bipolar structure, current collectors having a multi-layer structure composed of aluminum and copper lamination sheets may be used. In a general electrochemical cell having a bipolar structure, an electrolyte isolation member is installed on an edge portion of an electrode so as to prevent undesired phenomena between unit cells, such as current leakage, side reactions, and corrosion caused by the side reactions. For the same reason, an electrolyte should not be transmitted through a current collector of an electrode in the electrochemical cell having a bipolar structure.

In the bipolar structure, if electrolytes of neighboring unit cells are not securely isolated, current leakage occurs between the unit cells, and the unit cells corrode easily. Therefore, it is very difficult to isolate electrolytes of neighboring unit cells securely for a long time under various operation environments.

Another limitation of a bipolar electrochemical cell is that it is difficult to manufacture a high-capacity bipolar electrochemical cell. The areas of electrodes should be increased to increase the capacity of a bipolar electrochemical cell; however, in this case, the structural strength of the bipolar electrochemical cell is reduced, and it is more difficult to isolate electrolytes of neighboring unit cells and inject electrolyte into the unit cells. Furthermore, it is troublesome to assemble electrodes and separators into an electrochemical cell after electrolyte is filled between the electrodes and the separators.

An electrochemical cell having a quasi-bipolar structure similar to the bipolar structure has been developed.

FIG. 4 is a cross-sectional view illustrating a quasi-bipolar electrochemical cell of the related art.

Referring to FIG. 4, the quasi-bipolar electrochemical cell 40 includes current collectors 41, separators 42, positive active material layers 43, negative active material layers 44 and 45, and gaskets 46.

In the above-described bipolar electrochemical cell, active material layers having opposite polarities are disposed on both sides of a current collector. However, as shown in FIG. 5, a quasi-bipolar electrochemical cell electrode 50 includes a mono polar electrode and a quasi-bipolar electrode. The mono polar electrode includes current collectors 51 and 52, and positive and negative active material layers 53 and 54 respectively disposed on the current collectors 51 and 52 and connected to a terminal. The quasi-bipolar electrode includes a current collector 56, and positive and negative active material layers 57 and 58 disposed on the current collector 56 and spaced apart from each other with a current collector extension part 55 being located therebetween.

The electrodes are disposed with opposite polarities facing each other, and separators are disposed between the electrodes. In the quasi-bipolar structure, the quasi-bipolar electrode is used as opposite electrodes of neighboring unit cells. That is, neighboring unit cells are connected in series to each other through the current collector extension part of the quasi-bipolar electrode. In a bipolar structure, a current flows in a direction perpendicular to electrodes; however, in a quasi-bipolar structure, a current flows in a direction parallel to electrodes, that is, in a direction parallel to current collectors. In a quasi-bipolar electrochemical cell, an electrolyte isolation member, such as a gasket and an adhesive that are formed of a nonconductive material through which electrolyte cannot be transmitted, is disposed on a current collector extension part of a quasi-bipolar electrode located at the center portion of the quasi-bipolar electrode so as to isolate electrolytes of neighboring unit cells. However, if there is no extra electrolyte except for electrolyte at an active material layer of an electrode and a separator, such an electrolyte isolation member is not always necessary. In a sealed recombination lead acid battery, extra electrolyte does not exist at other regions than an active material layer of an electrode and a separator, and although extra electrolyte may exist, the extra electrolyte evaporates by an electrochemical reaction. Therefore, in a certain case, an electrolyte isolation member may be not necessary.

FIG. 5 is a perspective view illustrating an electrode of an electrochemical cell having a quasi-bipolar structure according to the related art.

As shown in FIG. 5, the quasi-bipolar electrochemical cell electrode 50 includes a mono polar electrode and a quasi-bipolar electrode. The mono polar electrode includes current collectors 51 and 52, and positive and negative active material layers 53 and 54 respectively disposed on the current collectors 51 and 52. The quasi-bipolar electrode includes a current collector 56 having a connection region 55, and positive and negative active material layers 57 and 58 symmetrically disposed with respect to the connection region 55.

FIG. 6 is a cross-sectional view illustrating an electrochemical cell having a stacked quasi-bipolar structure in the related art.

As shown in FIG. 6, the electrochemical cell 60 having a stacked quasi-bipolar structure includes negative active material layers 61 and 62, separators 63, positive active material layers 64, current collectors 65, and gaskets 66.

FIG. 7 is a view for explaining voltage variations of an electrochemical cell having a stacked quasi-bipolar structure in the related art.

In FIG. 7, reference numerals 71, 72, 73, and 74 denote current collectors, an electrolyte isolation wall, active material layers, and separators, respectively. The capacitance of one of the active material layers is $2C+\Delta$, and the capacitance of the others is $2C$.

In manufacturing electrodes of an electrochemical cell having a quasi-bipolar structure, if the same material of a current collector is used for positive and negative electrodes, electrodes are formed by a generally used active material forming method using a sheet, mesh, or grid current collector; however, if different current collector materials are used for positive and negative electrodes, after positive and negative electrodes are formed in a manner such that an active material does not exist at edge portions of a current collector, the portions where an active material does not exist may be electrically connected by an electric connecting method such as welding so as to form electrodes. Generally, the surface of a current collector is treated like an etched aluminum foil to increase the surface area of the current collector so as to attach an active material layer to the surface of the current collector more reliably.

In a quasi-bipolar structure, a quasi-bipolar electrode and a mono polar electrode may be wound around a core and connected in series to each other along the longitudinal direction of the core. This structure is advantageous for a high-capacity electrochemical cell; however, there is a need for an improved method of forming a reliable electrolyte isolation barrier wall between an electrode assembly and a case. In addition, to increase the reliability of products, what is needed is an electric connection method for connecting a voltage equalizing circuit to electrodes of unit cells so as to prevent voltage variations across the unit cells and current leakage of the unit cells caused by deficiency in electrolyte isolation ability of bipolar and quasi-bipolar structures.

DISCLOSURE OF INVENTION

Technical Problem

Accordingly, the present disclosure provides a reliable quasi-bipolar electrochemical cell in which a stable electrolyte isolation barrier wall is disposed between an electrode assembly and a case accommodating the electrode assembly.

The present disclosure also provides a quasi-bipolar electrochemical cell configured using a case and an electrolyte isolation barrier wall so that the quasi-bipolar electrochemical cell can be structurally simple and easy-to-assemble, and a reliable electric connection structure can be included in the quasi-bipolar electrochemical cell for voltage equalization.

Technical Solution

According to an aspect, there is provided an electrochemical cell including: an electrode including a current collector, and positive and negative active material layers disposed at both sides of the current collector and spaced apart from each other with a current collector extension part being located therebetween, wherein a polarity of the electrode is used as an opposite polarity in a neighboring cell; a core; an electrolyte isolation barrier wall disposed at the current collector extension part of the electrode; a case accommodating an electrode assembly formed by winding at least one electrode including the electrode around the core; and a bead formed at the case in which the electrode assembly is accommodated, the bead being disposed at a portion of the case corresponding to the electrolyte isolation barrier wall.

According to another aspect, there is provided an electrochemical cell including: an electrode including a current collector, and positive and negative active material layers disposed at both sides of the current collector and spaced apart from each other with a current collector extension part being located therebetween, wherein a polarity of the electrode is used as an opposite polarity in a neighboring cell; a core; a conductive electrolyte isolation barrier wall disposed at the current collector extension part of the electrode; and a case accommodating an electrode assembly formed by winding at least one electrode including the electrode around the core, wherein the case includes a plurality of conductive tubes, at least one insulation sealing part connecting the metal tubes neighboring each other, and a bead formed at one of the metal tubes disposed at the conductive electrolyte isolation barrier wall.

Advantageous Effects

In the electrochemical cell, a stable electrolyte isolation barrier wall can be easily formed between an electrode assembly and a case accommodating the electrode assembly, and an electric connection part that is simple and easy-to-manufacture can be formed using the case.

MODE FOR THE INVENTION

Hereinafter, specific embodiments will be described in detail with reference to the accompanying drawings.

Figure 1:
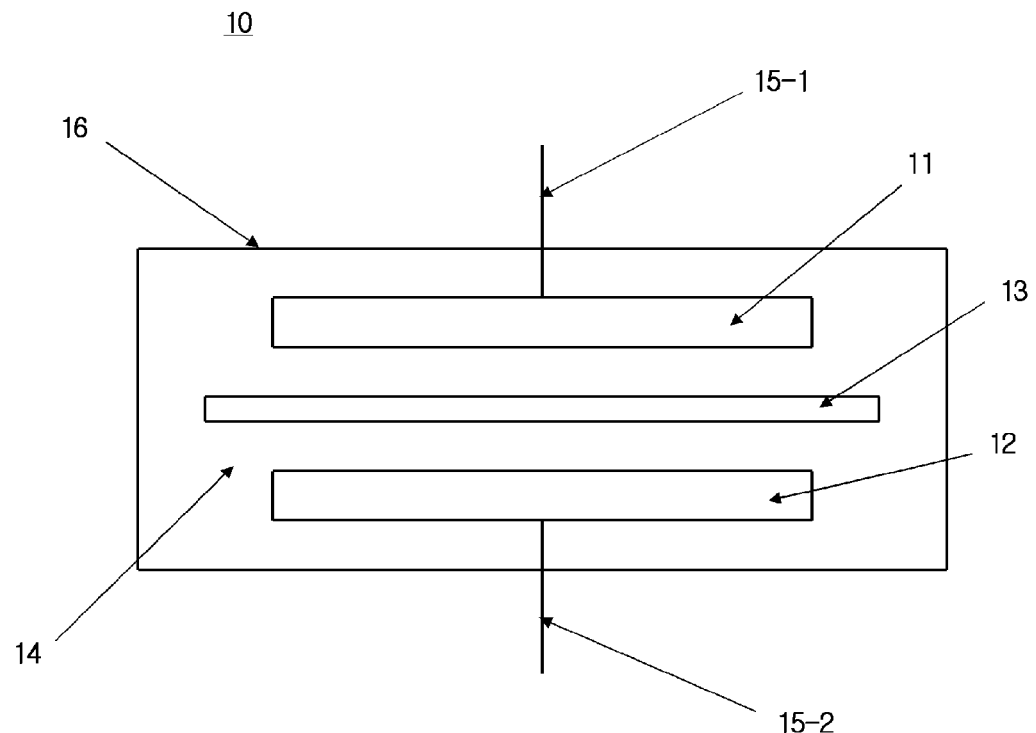
FIG. 1 illustrates an electrochemical cell of the related art.
Figure 2:
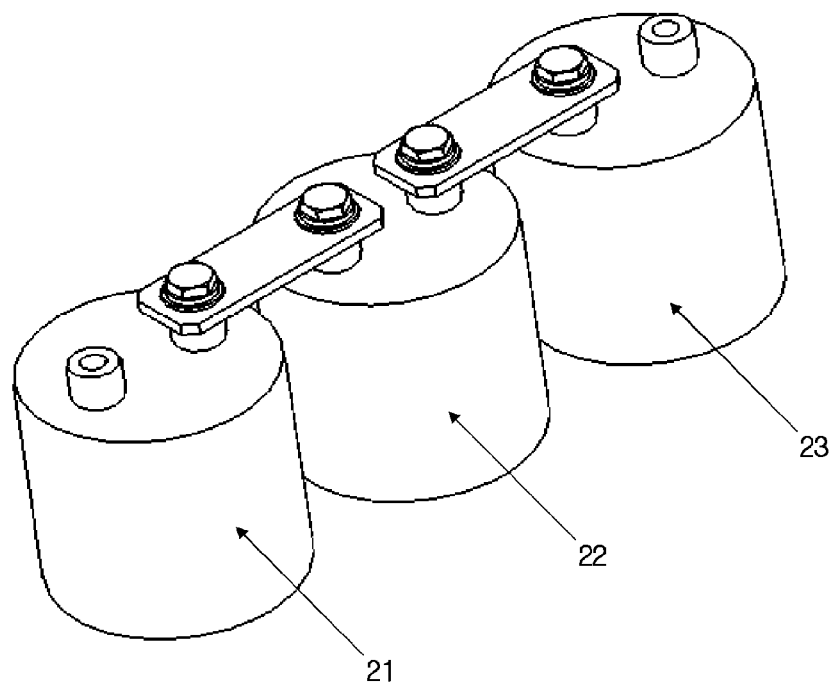
FIG. 2 illustrates unit cells connected in series to each other in the related art.
Figure 3:
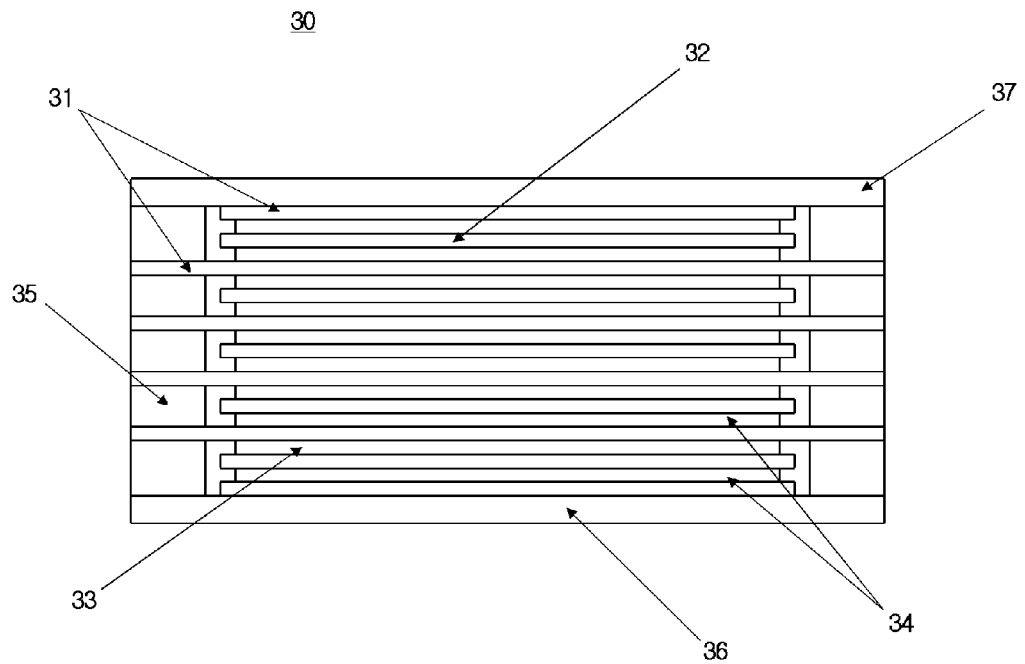
FIG. 3 is a cross-sectional view illustrating an electrochemical cell having a bipolar structure in the related art.
Figure 4:
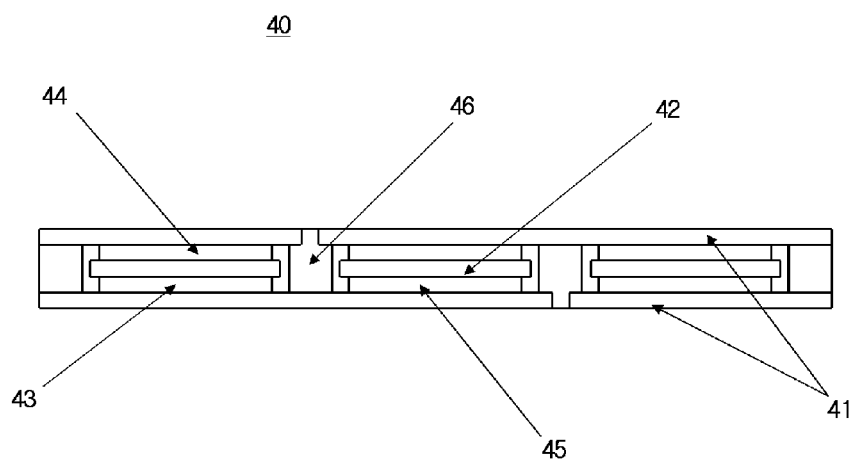
FIG. 4 is a cross-sectional view illustrating an electrochemical cell having a quasi-bipolar structure in the related art.
Figure 5:
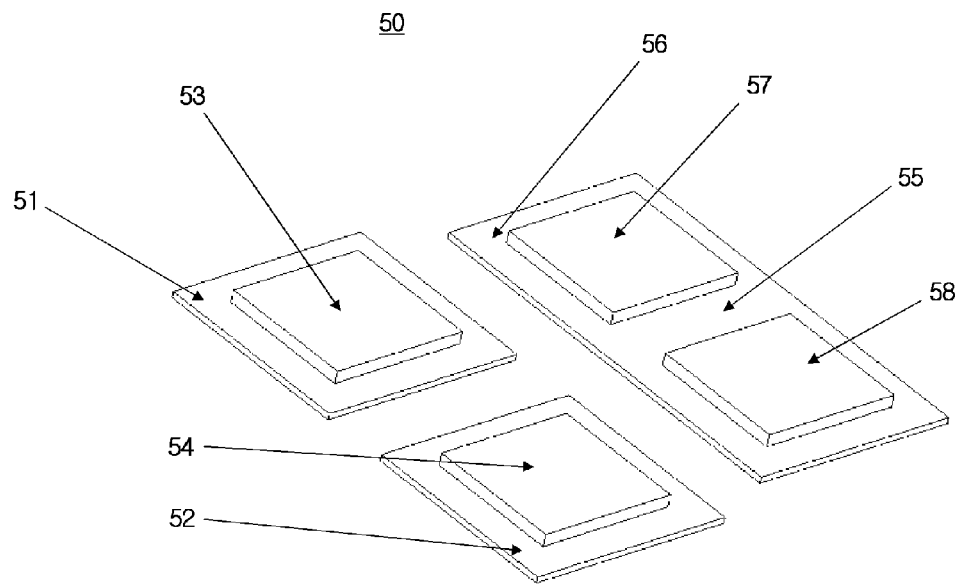
FIG. 5 is a perspective view illustrating an electrode of an electrochemical cell having a quasi-bipolar structure in the related art.
Figure 6:
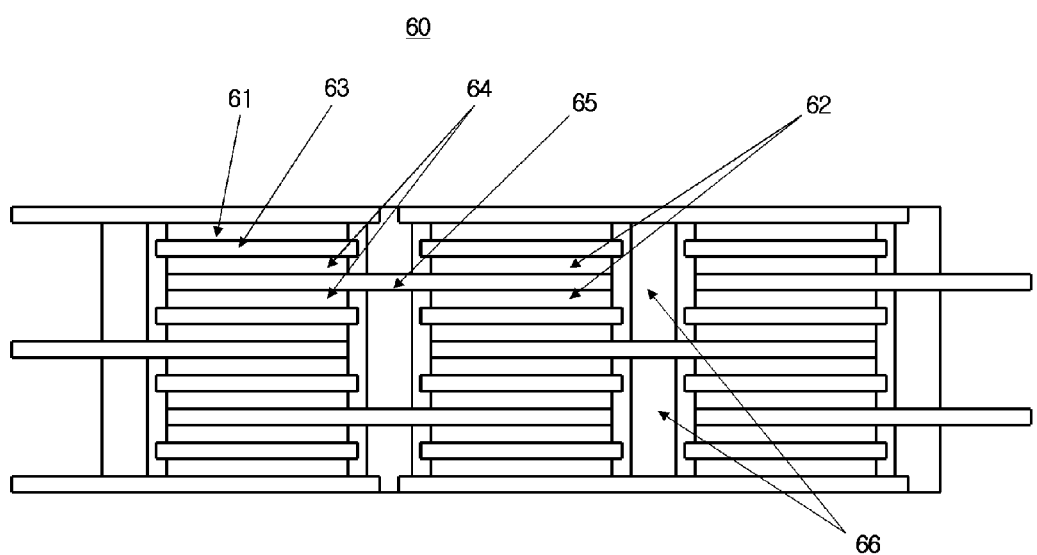
FIG. 6 is a cross-sectional view illustrating an electrochemical cell having a stacked quasi-bipolar structure in the related art.
Figure 7:
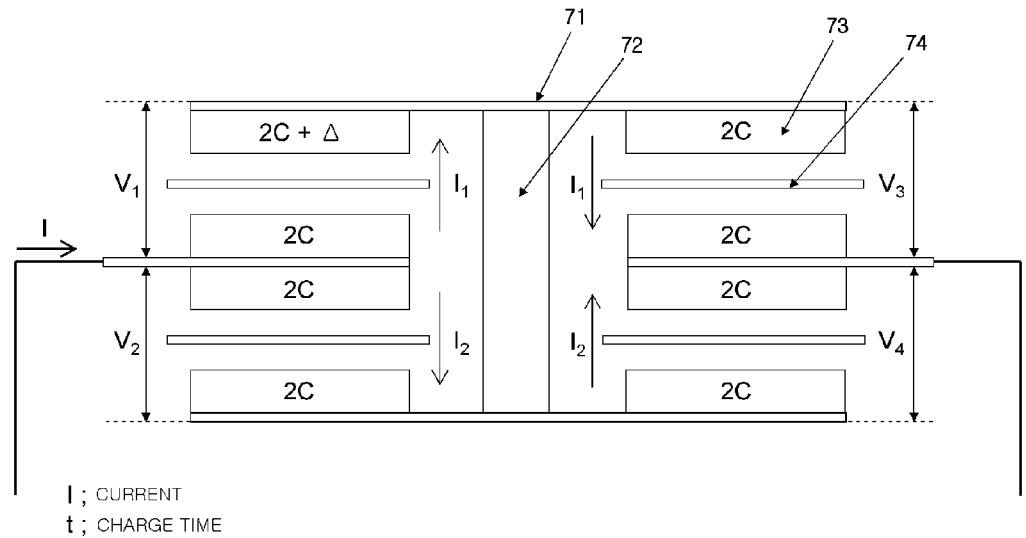
FIG. 7 is a view for explaining voltage variations of an electrochemical cell having a stacked quasi-bipolar structure in the related art.
Figure 8:
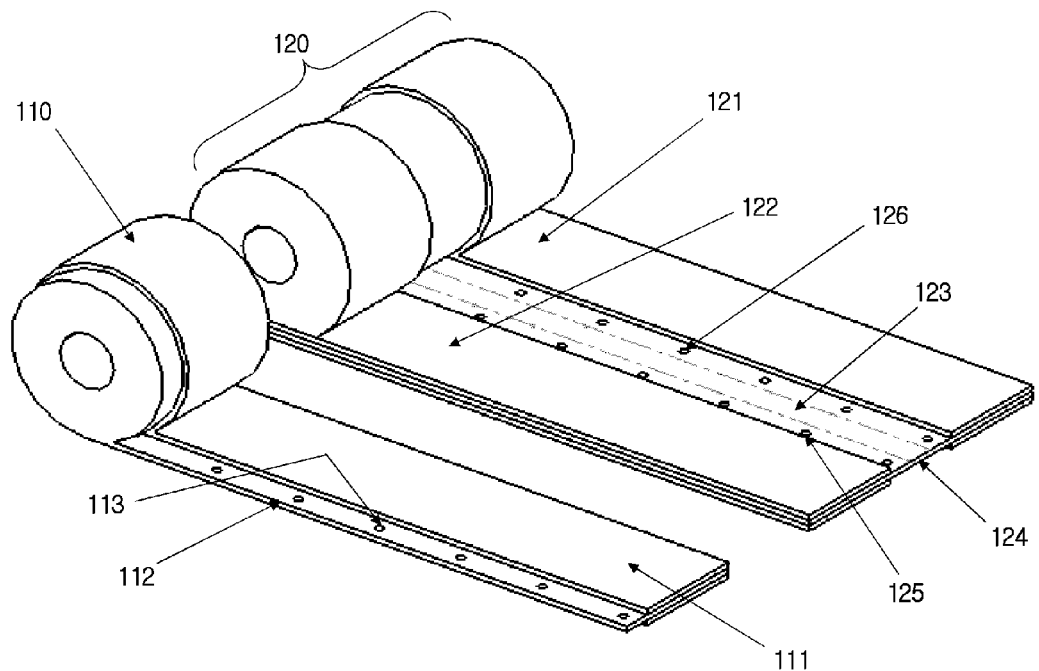
FIG. 8 is a perspective view illustrating electrodes of an electrochemical cell having a quasi-bipolar structure according to an exemplary embodiment.

FIG. 8 is a perspective view illustrating electrodes of an electrochemical cell having a quasi-bipolar structure according to an exemplary embodiment.

Referring to FIG. 8, the electrochemical cell 100 of the current embodiment includes a mono polar electrode 110 and a quasi-bipolar electrode 120.

The mono polar electrode 110 includes a current collector 112 and active material layers 111 formed on the current collector 112 and having one polarity.

The quasi-bipolar electrode 120 includes a current collector 124, and positive and negative active material layers 121 and 122 that are formed on the current collector 124 and spaced apart from each other. An electrolyte isolation part 123 is formed at a current collector extension part between the positive and negative active material layers 121 and 122 for installing an electrolyte isolation barrier wall on the electrolyte isolation part 123.

The mono polar electrode 110 is a part to be connected to an external terminal such that the current collector 112 of the mono polar electrode 110 has a foil or sheet shape for transmitting a current. The active material layers 111 are formed on the top and bottom sides of the current collector 112 and has a positive or negative polarity for storing electricity. The current collector extension part is formed at an outer side of the active material layers for connecting the mono polar electrode to an external terminal. In the case where the active material layers 111 are formed on both sides of the current collector 112, the active material layers 111 formed on both sides of the current collector 112 are configured to have the same polarity and overlap each other. That is, the active material layers 111 have the same width and position.

The current collector 124 of the quasi-bipolar electrode 120 has a foil or sheet shape for transmitting a current to the positive active material layers 121 and the negative active material layers 122. That is, the positive active material layers 121 and the negative active material layers 122 are formed on the top and bottom sides of the current collector 112 for storing electric energy. In the case where active material layers are formed on both sides of the current collector 124, the positive active material layers 121 and the negative active material layers 122 are formed in a manner such that layers of the same polarity are located on opposite sides of the current collector 124. That is, active material layers formed on both sides of the current collector 124 and having the same polarity are configured to have the same width and position. In general, positive and negative active material layers of a quasi-bipolar electrode, and positive and negative active material layers of a mono polar electrode have the same width.

If the electrochemical cell 100 is an electric double layer capacitor, the current collector 124 may be formed of aluminum, and active carbon powder may be used as positive and negative active materials. In this case, the active carbon powder may be mixed with a binder, a conductive material, and a solvent to form slurry or paste, and the slurry or paste may be directly applied to the current collector 124 to form active material layers. Alternatively, after fabricating an active material sheet, the active material sheet may be bonded to the current collector 124 to form an electrode. In addition, like in the case of other electrochemical cell electrodes, a current collector material having an increased surface area through a predetermined surface treatment, such as an etched aluminum foil, may be used to form the current collector 124 so as to easily attach an active material layer to the current collector 124. In most electric double layer capacitors, electrodes are not distinguished into positive and negative electrodes. However, in a general electrochemical cell, different active materials are used for positive and negative electrodes, and thus, electrodes are distinguished into positive and negative electrodes. Furthermore, different materials can be used for current collectors of positive and negative electrodes. In the case of a lithium ion battery, aluminum and copper are used as materials for the current collector 124. If the current collector 124 is formed of different materials, electrodes may be previously fabricated and then bonded through a predetermined method such as welding to form the quasi-bipolar electrode 120. In this case, a bonding line may be located within the electrolyte isolation part 123.

Figure 9:
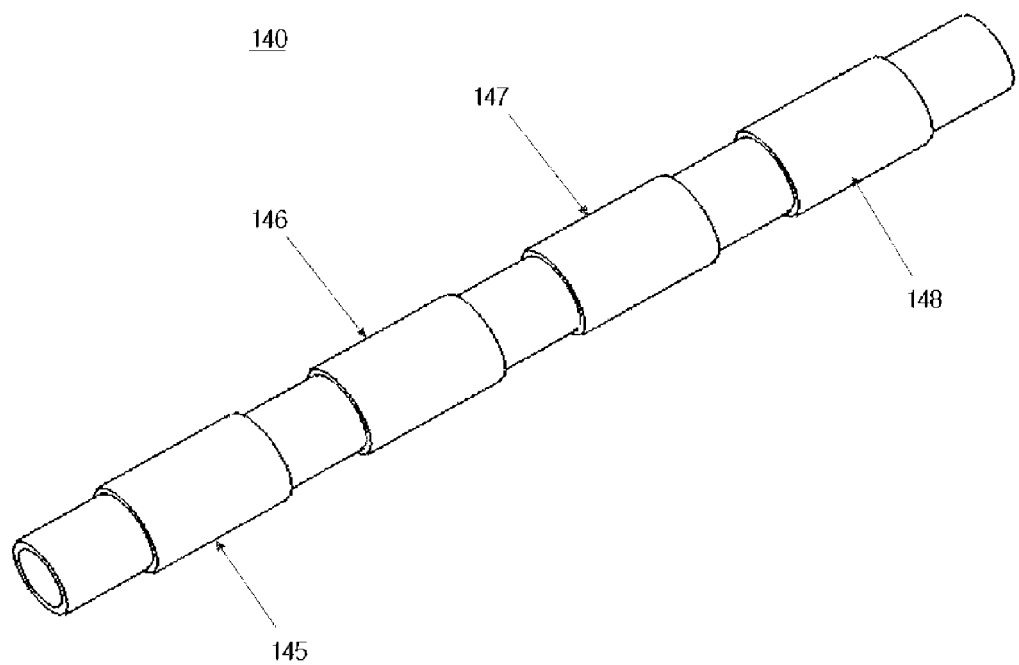
FIG. 9 is a perspective view illustrating a core of an electrochemical cell according to an exemplary embodiment.

FIG. 9 is a perspective view illustrating a core of an electrochemical cell according to an exemplary embodiment.

As shown in FIG. 9, the electrochemical cell of the current embodiment includes a core 140 around which the mono polar electrode 110 and the quasi-bipolar electrode 120 illustrated in FIG. 8 can be wound.

Tapes 145 to 148 are attached to the core 140 at predetermined intervals. The tapes 145 to 148 are illustrated as an exemplary method for fixing electrodes to the core 140 when starting to wind the electrodes around the core 140.

The core 140 is formed of a plastic such as polyethylene, polypropylene, polyphenylene sulfide (PPS), and phenol resin, or a metal such as aluminum. The core 140 has a pipe shape.

In the current embodiment, tapes may be attached to the surface of the core 140 to easily fix electrodes to the core 140 when starting to wind the electrodes around the core 140; however, the present invention is not limited thereto. For example, lamination films that can be treated by heat adhesion may be formed on the surface of the core 140, or the core 140 may be surface-treated to increase an attaching force of an adhesive to the core 140 or may be laminated with a film so that an electrolyte isolation barrier wall can be easily installed between unit cells. In addition, the surface of the core 140 may be hydrophobic treated so as to prevent the surface of the core 140 from being wet by electrolyte and a cross linkage of electrolyte between the outside and inside of the core 140.

Figure 10:
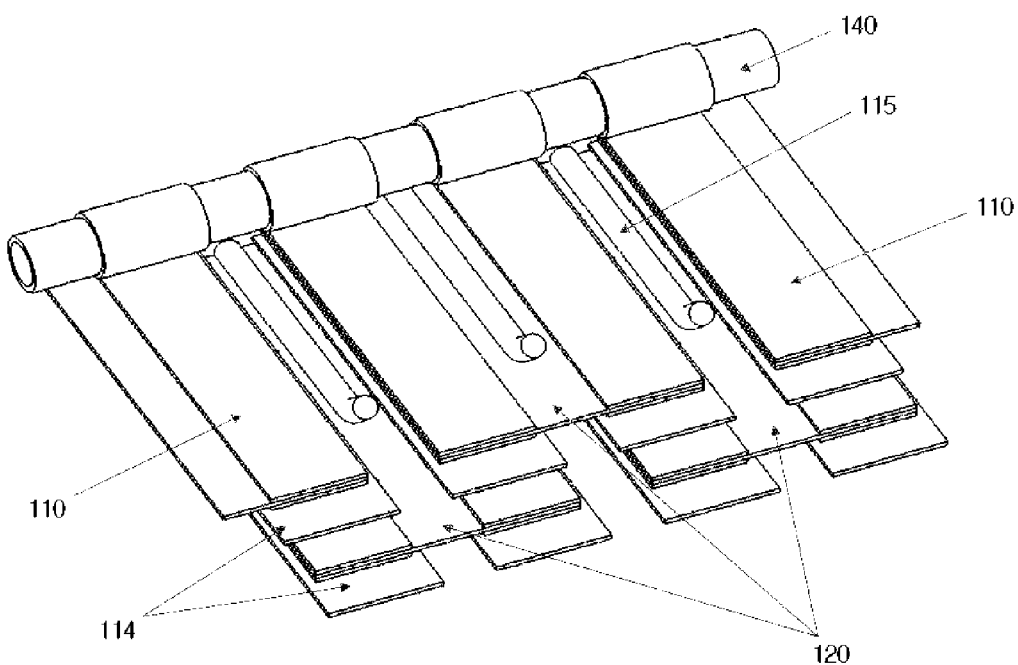
FIG. 10 is a perspective view illustrating mono polar and quasi-bipolar electrodes of FIG. 8 wound around the core of FIG. 9.

FIG. 10 is a perspective view illustrating an electrochemical cell having a quasi-bipolar structure in which the mono polar and quasi-bipolar electrodes of FIG. 8 wound around the core of FIG. 9. That is, assembling of an electrochemical cell in which four unit cells are connected in series is illustrated. Mono polar electrodes 110, quasi-bipolar electrodes 120, and separators 114 are arranged for being wound around the core 140. In the current embodiment, an explanation is given on a quasi-bipolar structure in which four unit cells are connected in series. However, the present invention is not limited to a particular number of unit cells connected in series.

Neighboring cells are connected in series in a manner such that polarities of the quasi-bipolar electrode 120 are used as opposing polarities in neighboring cells, and the two mono polar electrodes 110 that will be connected to terminals are arranged in a manner such that the mono polar electrode 110 is disposed at a side of the separator 114 to face the active material layer of the quasi-bipolar electrode 120 having an opposing polarity and disposed at the other side of the separator 114.

The width of the separators 114 is slightly larger than the width of active material layers attached to current collectors.

To form an electrolyte isolation barrier wall between unit cells, the electrodes are wound around the core 140 while continuously applying an adhesive 115 to the electrolyte isolation parts 123 of the electrodes. A material through which electrolyte cannot be transmitted is used to form the electrolyte isolation barrier wall, and instead of the adhesive 115, epoxy, paste, liquid sealant, or molten resin can be used. In addition, a strip formed of a thermoplastic resin such as polyethylene or rubber may be used, alone or together with an adhesive, to form the electrolyte isolation barrier wall. While the electrodes are wound around the core 140, the adhesive 115 applied to the electrodes forms electrolyte isolation barrier walls on the surfaces of the electrodes that are already wound around the core 140 to isolate electrolytes of neighboring unit cells. At the same time, electrolyte isolation barrier walls are formed between the core and the electrodes. When strips formed of thermoplastic resin are used to form electrolyte isolation barrier walls, electrodes are heated to a temperature higher than the melting point of the strips after the electrodes are wound around the core, so as to form the electrolyte isolation barrier walls by fusing the strips to current collectors.

Figure 11:
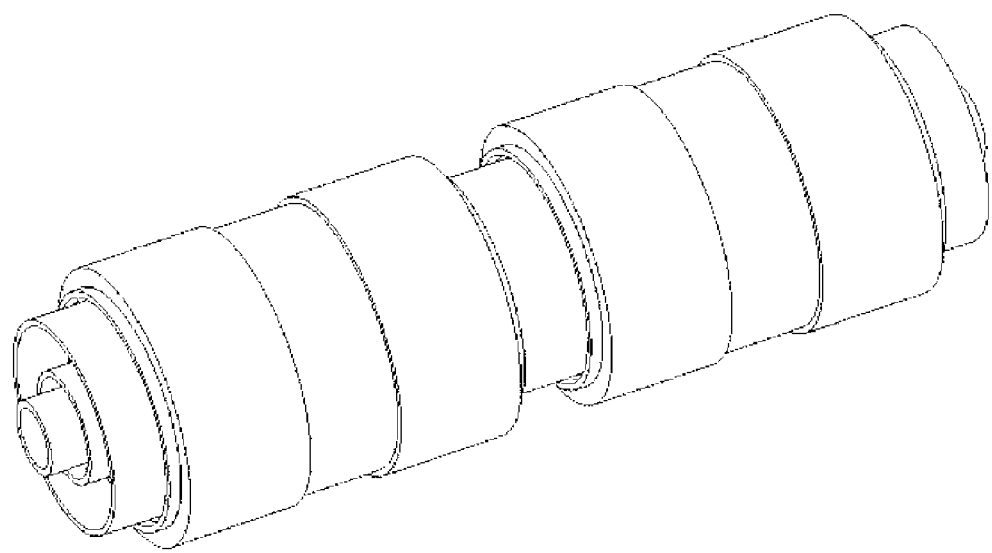
FIG. 11 is a perspective view illustrating an electrode assembly of an electrochemical cell according to an exemplary embodiment.

By winding the electrodes around the core as described above, an electrode assembly can be formed as shown in FIG. 11.

Figure 12:
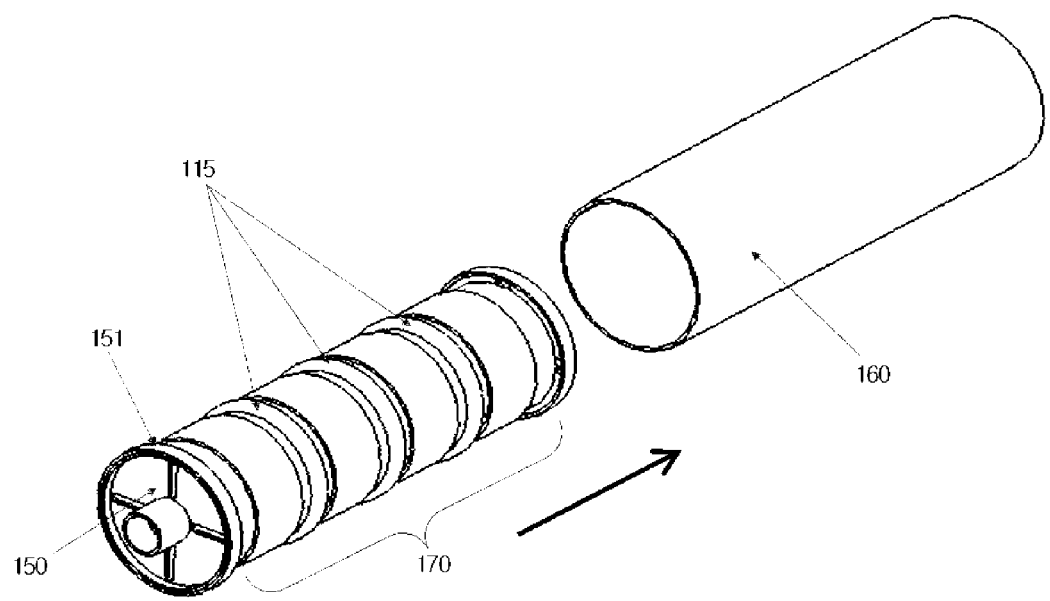
FIG. 12 is an exploded perspective view illustrating the electrochemical assembly of FIG. 11 and a case.

FIG. 12 is an exploded perspective view illustrating the electrochemical assembly of FIG. 11 and a case.

Figure 14:
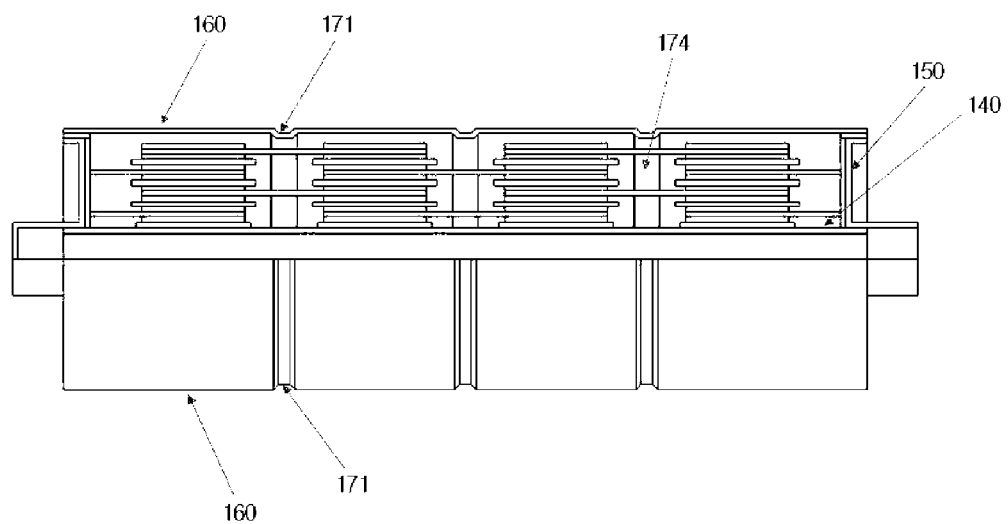
FIG. 14 is a sectional view illustrating the electrochemical cell of FIG. 13, according to an exemplary embodiment.

Referring to FIG. 12, covers 150 used as terminals are coupled to both sides of the core 140, and gaskets 151 are coupled to the covers 150 for preventing a short circuit between the covers 150 and a case 160. Then, after aligning the center axis of the case 160 with the center axis of the core 140, an electrode assembly 170 is inserted into the case 160. After the electrode assembly 170 is inserted in the case 160, beads 171 are formed at the adhesive 115 applied to the electrolyte isolation parts 123 of electrodes exposed to the outside of the electrode assembly 170 as shown in FIG. 14, and thus the adhesive 115 applied to the electrolyte isolation parts 123 of the exposed electrodes of the electrode assembly 170 can be pressed by the beads 171. In this way, barrier walls are formed between the electrodes and the case 160 for isolating electrolytes. To form the electrolyte isolation barrier walls, instead of using the adhesive, epoxy, paste, liquid sealant, and molten resin can be used. In addition, a strip formed of rubber or a thermoplastic resin may be used, alone or together with an adhesive, to form the electrolyte isolation barrier walls. The electrolyte isolation barriers walls can be reinforced by inserting the electrode assembly 170 into a heat shrinkable tube to shrink the electrode assembly 170 after applying the adhesive 115 to the electrolyte isolation parts 123 of the electrode assembly 170, and reinserting the electrode assembly 170 into the case 160 made of a metal, and forming the beads 171 at the electrolyte isolation parts 123. Alternatively, instead of using an adhesive to form the electrolyte isolation barrier walls, the electrolyte isolation barrier walls can be formed as follows: the electrode assembly is wrapped with a sheet formed of a thermoplastic resin; the electrode assembly is inserted into the case 160 formed of a metal to form the beads 171 at the electrolyte isolation parts 123 of the electrodes; and the electrode assembly is heated to a temperature equal to or higher than the melting point of the thermoplastic resin to form the electrolyte isolation barrier walls between the beads 171 of the case 160 and the electrolyte isolation parts 123 of the exposed electrodes of the electrode assembly 170. If necessary, the electrolyte isolation barrier walls may be formed of a conductive material.

The case is generally formed of a metal such as aluminum and stainless steel, and for the electrochemical stability, the case may be formed of the same kind of material as that used for forming the current collector. Particularly, in the case where the case is used as a pole of a terminal, the electrochemical stability of the case is important. Alternatively, the case may be formed of a resin.

After the electrode assembly is inserted into the case as described above, a laser beam is irradiated into grooves 172 formed in the covers from the outsides of the covers so as to electrically connect extension portions of current collectors of the mono polar electrodes exposed at both sides of the electrode assembly to connection portions (terminals) of the covers by welding.

In the case of an electric double layer capacitor, particularly, an electric double layer capacitor using an organic electrolyte, a drying process is necessary to remove moisture and other impurities before an electrolyte injecting process, like in the case of other electrochemical cells. The process temperature of the drying process varies according to the kinds of active material and other materials, and in the case of the electric double layer capacitor, the process temperature may range from about 70° C. to about 180° C. Therefore, in the case where a sheet or strip formed of a thermosetting epoxy or a thermoplastic resin such as a thermoplastic polypropylene, or a molten resin such as a molten polyethylene is used to form electrolyte isolation barrier walls instead of using an adhesive, although the sheet, strip, or molten resin is not sufficiently adhered to a core, electrodes, and a case during a process of winding the electrodes around the core, the sheet, strip, or molten resin can be sufficiently adhered during the drying process. Therefore, electrolyte isolation barrier walls can be stably formed.

Figure 13:
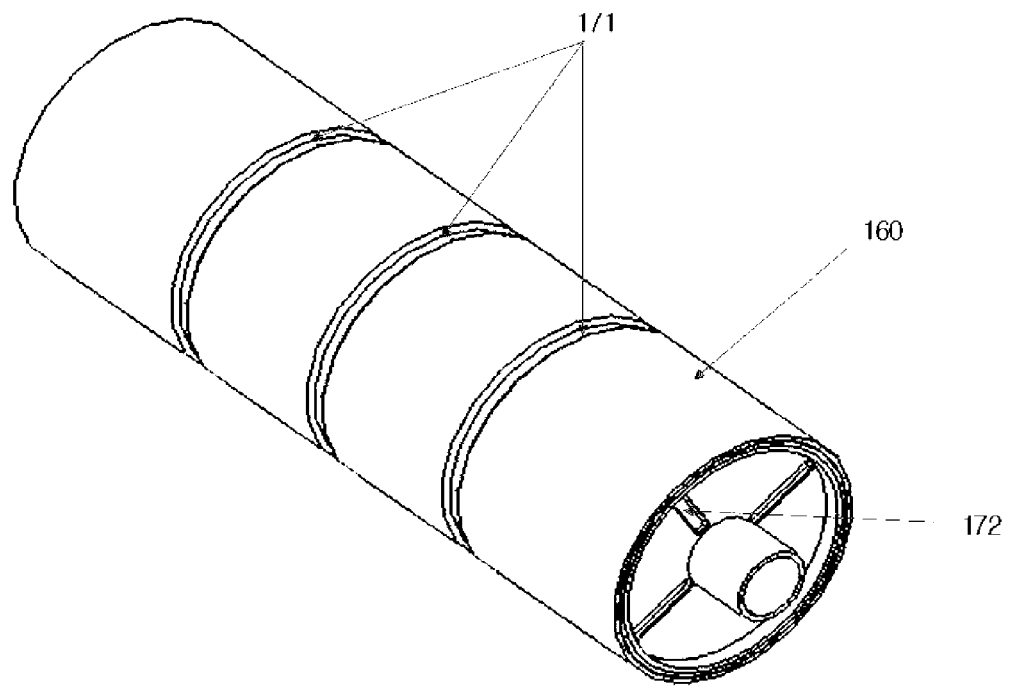
FIG. 13 is a perspective view illustrating an electrochemical cell including beads according to an exemplary embodiment.

FIG. 14 is a cross-sectional view illustrating the electrochemical cell of FIG. 13, which has a pipe type case and a four-series quasi-bipolar structure.

As shown in FIG. 14, electrolyte isolation barrier walls 174 are formed between the electrode assembly and the case 160 owing to the beads 171 formed in the case 160. In the case where the case is formed of a metal, the electrochemical cell can be structurally strong, and the electrolyte isolation barrier walls can also be strong owing to meal beads so that electrolyte can be reliably isolated by the electrolyte isolation barrier walls.

Furthermore, the metal case can be used as an electric connection part for voltage equalization.

Figure 15:
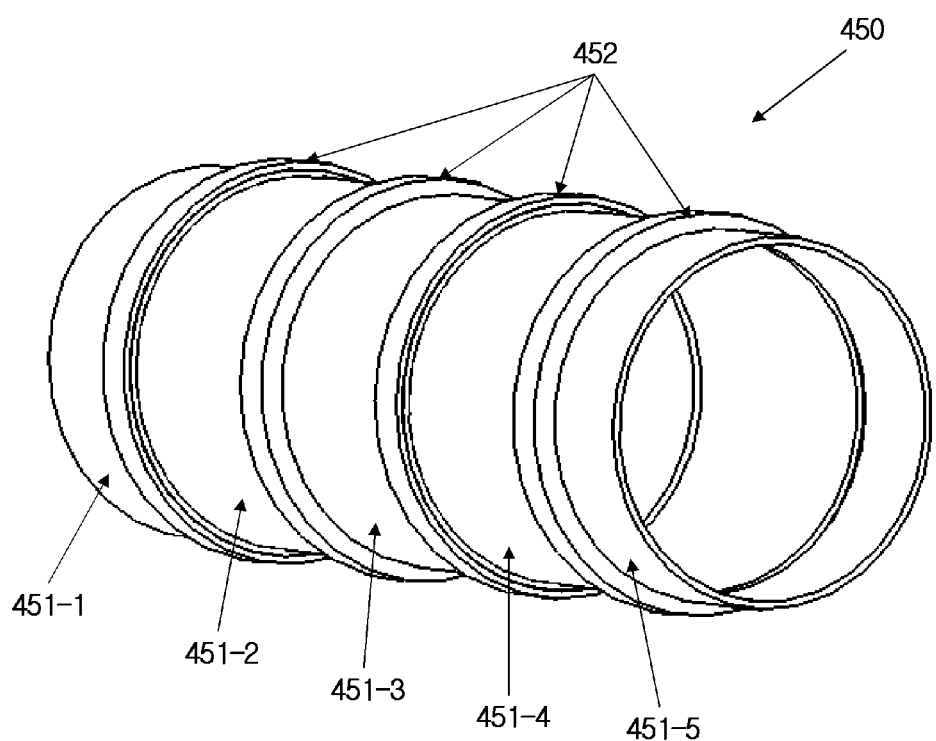
FIG. 15 is a perspective view illustrating a case of an electrochemical cell that is composed of a plurality of metal tubes according to an exemplary embodiment.

FIG. 15 is a perspective view illustrating a case of an electrochemical cell that is composed of a plurality of metal tubes according to an exemplary embodiment.

As shown in FIG. 15, in the current embodiment, the electrochemical cell case 450 is formed by connecting a plurality of metal tubes 451-1 to 451-5. The metal tubes 451-1 to 451-5 are connect to each other using insulation sealing parts 452.

In the case 450, the metal tubes 451-1 to 451-5 are connected by the insulation sealing parts 452 using a method such as seaming or hemming. Thus, the metal tubes 451-1 to 451-5 can be electrically connected to each other.

Instead of applying an adhesive around portions of the electrode assembly of FIG. 13 where electrolyte isolation barrier walls are formed, a conductive adhesive is applied, and after the electrode assembly is inserted into the case, beads 171 are formed on portions of the case to form the conductive adhesive as conductive electrolyte isolation barrier walls between the beads 171 and current collector extension parts of quasi-bipolar electrodes. In the same manner, the metal tubes of the case 450 can be electrically connected to the current collector extension parts of the quasi-bipolar electrodes by inserting the electrode assembly into the case 450 and forming beads on the case 450. Therefore, voltage equalization and detection are possible by connecting a voltage equalizing device to the metal tubes using an electric connection part.

In a method of using a case as electric connection means for voltage equalization, when an electrode assembly is formed by winding quasi-bipolar electrodes, mono polar electrodes, and separators around a core and forming electrolyte isolation barrier walls at electrolyte isolation barrier wall installation parts of current collector extension parts of the quasi-bipolar electrodes, the electrolyte isolation barrier walls may be conductive or nonconductive. In the case where the electrolyte isolation barrier walls are conductive, during a voltage equalization operation, a current can flow in the electrode assembly in the radial directions of the electrode assembly as well as the length direction of electrodes. Therefore, electric resistance can be reduced, and thermal conductivity can be increased, so that the electrochemical cell can be easily cooled. The conductive tubes may be formed of a metal. For example, the conductive tubes may be formed of the same kind of material as that used for forming current collectors of electrodes.

In the above-described descriptions, an electric double layer capacitor is illustrated as an example for explaining an electrochemical cell of the present invention; however, the present invention is not limited to the electric double layer capacitor.

As described above, embodiments provides a modularized quasi-bipolar electrochemical cell, which can be applied to an ultracapacitor such as an electric double layer capacitor, and to other electric energy storage devices such as a lead acid battery, a NiMH battery, a NiCd battery, a lithium ion battery, and an aluminum electrolytic capacitor.

While structures, operations, manufacturing methods have been particularly shown and described with reference to exemplary embodiments, it will be understood by those of ordinary skill in the art that various changes in form and details may be made therein without departing from the spirit and scope of the present invention.

The invention claimed is:

1. An electrochemical cell comprising:
  an electrode including a current collector, and positive and negative active material layers disposed on a first side and on a second side of the current collector, the positive and negative active material layers being spaced apart from each other with a current collector extension part therebetween, wherein a polarity of the electrode is used as an opposite polarity in a neighboring cell;
  a core;
  an electrolyte isolation barrier wall disposed over the current collector extension part of the electrode;
  a case configured to accommodate an electrode assembly including at least one electrode wound around the core; and
  a bead provided on a portion of the case that is in contact with the electrolyte isolation barrier wall to isolate electrolytes from neighboring cells, the bead forming an uneven surface in the case.

2. The electrochemical cell of claim 1, wherein the electrolyte isolation barrier wall comprises an adhesive material.

3. The electrochemical cell of claim 1, wherein the electrolyte isolation barrier wall is formed of rubber.

4. The electrochemical cell of claim 1, wherein the case is formed of a metal.

5. The electrochemical cell of claim 4, wherein the case is formed of the same kind of metal as that used for forming the current collector of the electrode.

6. The electrochemical cell of claim 1, wherein the case is formed of a thermoplastic resin.

7. The electrochemical cell of claim 6, further comprising a metal film on the case.

8. The electrochemical cell of claim 6, wherein the electrode assembly is inserted into a reinforcement tube,
  and wherein the case is configured to accommodate the electrolyte assembly inserted into the reinforcement tube.

9. An electrochemical cell comprising:
  an electrode including a current collector, and positive and negative active material layers disposed on a first side and on a second side of the current collector, the positive and negative active material layers being spaced apart from each other with a current collector extension part therebetween, wherein a polarity of the electrode is used as an opposite polarity in a neighboring cell;
  a core;

a conductive electrolyte isolation barrier wall disposed over the current collector extension part of the electrode; and a case configured to accommodate an electrode assembly including at least one electrode wound around the core, wherein the case comprises a plurality of conductive tubes, at least one insulation sealing part connecting neighboring conductive tubes, and a bead provided on a portion of one of the conductive tubes that is in contact with the conductive electrolyte isolation barrier wall to isolate electrolytes from neighboring cells, the bead forming an uneven surface in the case.

10. The electrochemical cell of claim 9, wherein the conductive tubes are formed of a metal.

11. The electrochemical cell of claim 10, wherein the case is formed of the same kind of metal as that used for forming the current collector of the electrode.

12. The electrochemical cell of claim 9, wherein the electrode assembly is inserted into a reinforcement tube, and wherein the case is configured to accommodate the electrode assembly inserted into the reinforcement tube.

13. The electrochemical cell of claim 9, wherein the electrolyte isolation barrier wall comprises an adhesive material.

14. The electrochemical cell of claim 9, wherein the electrolyte isolation barrier wall is formed of rubber.

\* \* \* \* \*